No. 754,417. Patented March 15, 1904.

UNITED STATES PATENT OFFICE.

PHILIP J. BRAHEN, OF HARTFORD, CONNECTICUT, ASSIGNOR TO AMERICAN RESTORING COMPANY, OF HARTFORD, CONNECTICUT, A CORPORATION OF SOUTH DAKOTA.

STONE-CLEANING COMPOSITION AND METHOD OF MAKING SAME.

SPECIFICATION forming part of Letters Patent No. 754,417, dated March 15, 1904.

Application filed June 9, 1902. Serial No. 110,772. (No specimens.)

*To all whom it may concern:*

Be it known that I, PHILIP J. BRAHEN, a citizen of the United States, residing in Hartford, in the county of Hartford and State of Connecticut, have invented certain new and useful Improvements in Stone-Cleaning Compositions and Methods of Compounding the Same, of which the following is a specification.

This invention relates to renovating stone, and has for its objects to provide an improved stone-cleaning composition and a method for compounding the same.

As is well known, stone and marble structures which are exposed to the elements become soiled and stained and in certain instances become covered with moss and mold, all of which it is difficult to remove, whereby to restore the original beauty of the material of the structure. I provide, therefore, an improved renovator by which it is possible to remove mold, moss, stains, dirt, &c., leaving the stone in a condition similar to that in which it was when it was first tooled, and this without great expense, time, or labor and without any disagreeable odor. The stone after being subjected to treatment by the improved renovator will remain in its natural beauty for as long a time or longer as the new stone remained.

The improved renovator is composed of or results from the mixing of the following ingredients: chlorid of lime, (calcium hypochlorite,) whiting, (calcium carbonate,) sodium chlorid or common salt, and sodium carbonate.

The ingredients may be prepared for use and compounded in the following proportions: First mix one and one-half pounds or twelve parts of chlorid of lime (calcium hypochlorite) and one-half pound or four parts of whiting (calcium carbonate) together in some convenient vessel. Then dissolve two ounces or one part of sodium chlorid and two pounds or sixteen parts of sodium carbonate in four quarts or sixty-six and two-thirds parts of boiling water and pour over the mixture of chlorid of lime and whiting and stir slowly until thoroughly mixed. The mixture may be permitted to stand from four to six hours before using.

In using the renovator it may be applied to the stone or marble in any manner—as, for instance, with a spray or brush. After it has remained upon the surface for a few minutes it may be rubbed with a scrubbing or other brush, when the original beauty of the stone will be restored.

Having thus described my invention, I claim—

1. The method of compounding a cleaning composition for stone and marble which consists in mixing together twelve parts of chlorid of lime, and four parts of whiting, then dissolving one part of sodium chlorid and sixteen parts of sodium carbonate in about sixty-six and two-thirds parts of boiling water, then pouring the same over the chlorid of lime and whiting and slowly stirring the same.

2. The method of compounding a cleaning composition which consists in mixing together chlorid of lime and whiting in about the proportions stated, then dissolving sodium chlorid and sodium and sodium carbonate in water, in about the proportions stated, then introducing the same to the mixed chlorid of lime and whiting.

3. A cleaning composition resulting from the mixing of twelve parts of chlorid of lime, four parts of whiting, sixteen parts of sodium carbonate, one part of sodium chlorid and sixty-six and two-thirds parts of water.

PHILIP J. BRAHEN.

Witnesses:
CHAS. S. RUSSELL,
HENRY BISSELL.